Figure 1:
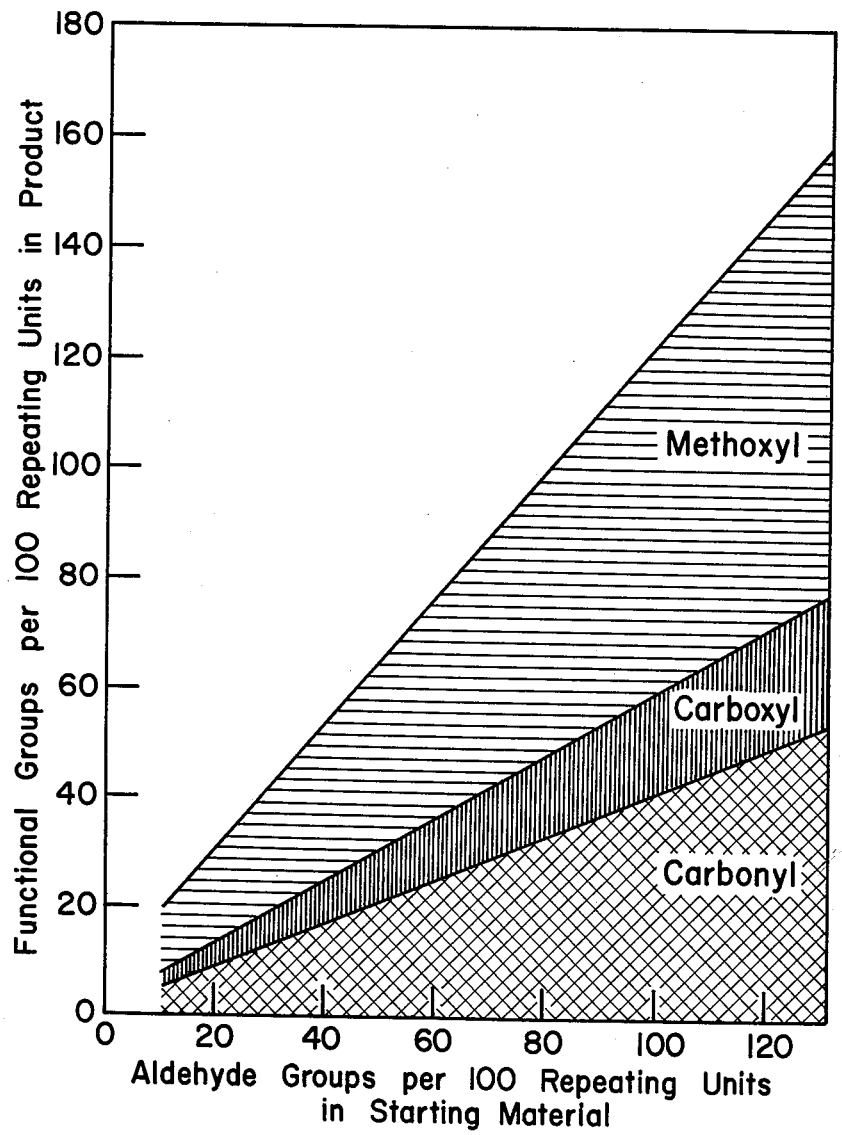
Figure 2:
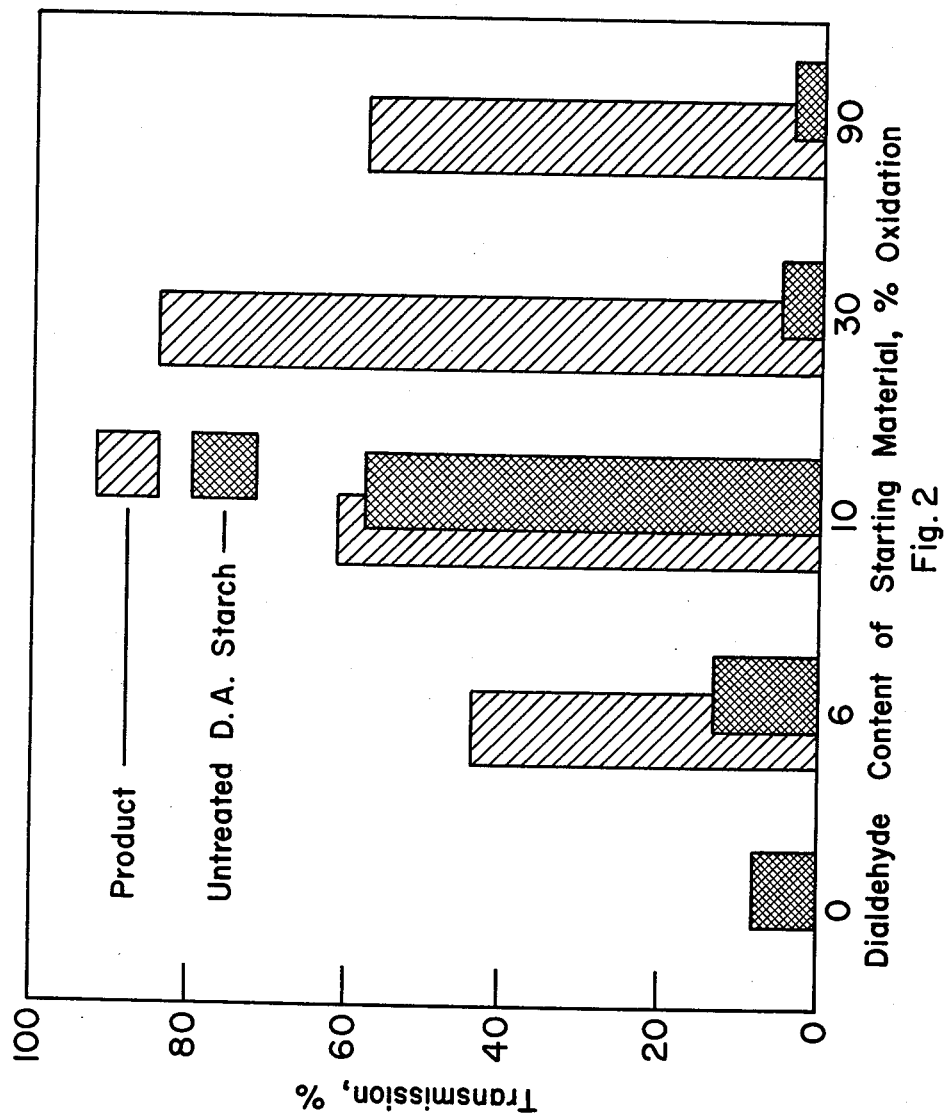

United States Patent Office 3,033,851
Patented May 8, 1962

3,033,851
HETEROFUNCTIONAL DERIVATIVES OF DIALDEHYDE STARCHES AND METHOD OF MAKING SAME
Wilbur C. Schaefer and Charles R. Russell, Peoria, Ill., assignors to the United States of America as represented by the Secretary of Agriculture
Filed Apr. 18, 1961, Ser. No. 103,948
2 Claims. (Cl. 260—233.3)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to new and useful derivatives of lowly (5 percent) to substantially fully periodate-oxidized (dialdehyde) starches, our novel derivatives being readily and inexpensively prepared by subjecting a said lowly to highly oxidized dialdehyde starch to the action of a novel polyfunctional reagent, namely a solution of chlorine in anhydrous methanol.

Periodate-oxidized (dialdehyde) starches which have been prepared by oxidizing starch with calculated amounts of periodic acid or sodium metaperiodate are readily obtained in slightly oxidized form (5 percent of the anhydroglucose units being substituted by dialdehyde) to the substantially fully oxidized form (95 or more percent of the units being so substituted), the latter being commercially available. In other words, the dialdehyde starches are characterized chemically by the fact that the above stated proportions of their original anhydroglucose units have been modified so as to contain two aldehydic carbonyl groups per AGU with the result that the substantially fully oxidized polymer consists of repeating units that also may be described as comprising an acetal-linked alternation of glyoxal and erythrose sub-units.

For sizing agent use in the paper and textile industries it is well known to extensively depolymerize starch by heat dextrinization or by subjecting starch to treatment with an aqueous solution of a mineral acid such as HCl. It is also old to slightly oxidize starch by treating it with an aqueous solution of hypochlorous acid. Although the above products are used as sizing agents for paper and textiles because they have fairly low paste viscosities, their strengths are reduced because of the high extents of depolymerization. Probably also because of the extensive depolymerization, industrial wastes where these sizing agents are employed have extremely high BOD requirements, and in view of industrial volumes this has become a matter of great concern.

Highly oxidized dialdehyde starch is known to have a low BOD, which property would obviate one of the principal problems attending the extensive industrial use of the above mentioned prior art starch products and derivatives as sizing agents for paper and textiles. In areas where stringent legislation relative to the problems of industrial waste and BOD is under consideration or has been enacted, the affected industries are now turning to costly synthetic resins because although unmodified highly oxidized dialdehyde starches have low BOD's, they are not water-dispersible without degradative heating in dilute alkali or acid or with a dispersing agent such as borax or bisulfite. Furthermore, as shown by Sloan et al., Ind. and Eng. Chem. 48: 1165–1172 (1956), and Mellies et al., ibid. 50: 1311–1314 (1958), the alkali- solubilized dialdehyde starches gelatinize at somewhat higher temperatures than do other conventional starch products and are so susceptible to continued depolymerization that they lack stable viscosities. In addition, pastes of the highly oxidized dialdehyde starches lack the high clarities demanded in paper and textile sizing agents.

Our invention is based on the surprising discovery that a solution of chlorine gas in anhydrous methanol is not simply chlorine in an indifferent vehicle but is a complex polyfunctional reagent which reacts with dialdehyde starches in a surprisingly different manner than do methanolic or aqueous solutions of hydrochloric acid to yield essentially intact polyfunctional polymers containing significant and essentially critical amounts and proportions of introduced carboxyl groups and introduced methoxyl groups and also containing a critical residual of carbonylic aldehyde groups. Although we do not intend to be held responsible for the accuracy of the following theory, it appears that the action of methanolic chlorine on dialdehyde starches involves three related reactions. First, an apparently reproducible proportion of the original aldehyde groups is oxidized to carboxyl groups (depending on the degree of oxidation of the starting material). Then, HCl, resulting from the reduction of chlorine, catalyzes the reaction of methanol, with a portion of the newly formed carboxyl groups to form methyl esters and with part of the remaining original aldehyde groups of the dialdehyde starch starting material to form methyl acetals. Thus, our novel polymeric products contain methyl esters and methyl acetals in addition to functionally balanced proportions of residual carbonyl groups and carboxyl groups, which together confer a heretofore unobtainable combination of properties.

The polyfunctional changes produced by reacting dialdehyde starches of different degrees of oxidation with methanol chlorine for 2 hours at 25° C. are shown in FIGURE 1. It is seen that in the products from dialdehyde starches that had been periodate oxidized to the extent of between about 30–60 percent the content of residual aldehyde is slightly less than half the starting value, carboxyl content ranges from 15–20 percent of the starting aldehyde content, and the content of methoxyl groups is approximately equal to aldehyde plus carboxyl. The above relationship, however, is not maintained with the reaction products of the very highly oxidized dialdehyde starches which are much more reactive, apparently because they gelatinize during the reaction and thus permit better contact. For comparison, the product from 93 percent dialdehyde starch (186 carbonyl groups per 100 repeating units) contained 34 residual carbonyl groups, 37 carboxyl groups, and 153 methoxyl groups per 100 repeating units after a 2-hour reaction at the mild temperature of 15° C.

A primary object of our invention, therefore, is the chemical modification of periodate-oxidized dialdehyde starches, in which at least about 5 percent and up to 95 or more percent of the anhydroglucose units originally contained dialdehyde substitution, to yield substantially intact and undegraded polymers that have substantially the same desirably low BOD values as the corresponding unmodified dialdehyde starches while exhibiting greatly improved water-dispersibility, improved clarity, lower gelatinization temperatures, low paste viscosities, and substantial freedom of the pastes from retrogradation and setback. A further object is a novel reagent which, without effecting extensive depolymerization, results in reproducibly converting a rather specific major proportion of the original carbonyl content of the dialdehyde starches mostly to methoxyl groups and partly, though to a lesser extent, to carboxyl groups so as to provide a polyfunctionally-substituted starch. A still further object of our invention is the preparation of polyfunctional dialdehyde starch derivatives having greatly improved properties that are of especial value in the paper and textile sizing industries. Other objects will appear hereinafter, particularly with reference to the astonishingly increased dispersant action exhibited by the products of this invention, the dispersant carboxyl content of our product, which, upon neutralization apparently permits better dispersion.

TABLE I

| Reagent | Functional Groups Per 100 Repeating Units | | | Gelatinization Temp. at start, °C. | Clarity [a], percent | Brookfield viscosity [a, b], Cps. |
|---|---|---|---|---|---|---|
| | Aldehyde | Carboxyl | Methoxyl | | | |
| Chlorine | 3.2 | 2.6 | 5 | [c] 58 | [c] 43 | [c] 58 |
| HCl | 2.0 | 0.2 | 7 | 60 | 9 | 945 |
| None (5% DAS before reaction) | 11.2 | 0.2 | 0 | 75 | 10 | 11,200 |

[a] Solids content, 10%.
[b] Viscosities were measured at 25° C. 1 hour after pastes were removed from amylograph.
[c] Sample was pasted in the presence of sodium hydroxide equivalent to its cold paste acidity in order to make final paste pH similar to that of other samples.

effect being illustrated with, but not being limited to, 50 percent aqueous pastes of zinc oxide. Thus our novel dialdehyde starch-derived polymers also have distinct utility as dispersing agents for various pharmaceutical, cosmetic, and zinc oxide-containing paint compositions.

Briefly, in the instant invention we have discovered that when 1 to 15 parts of periodate-oxidized starch (oxidized by periodic acid to the extent of 5 percent to about 93 or more percent and thus originally containing from 10 to 186 or more aldehyde groups per 100 anhydroglucose repeating units) are suspended in about 20 volumes of methanol at about 10° C. and 1 part of chlorine is added thereto (to provide a chlorine concentration of about 5 percent w./v. to make available at least one chlorine atom per aldehyde group) while holding the temperature preferably at 10°–25° C. and not above 40° C., while stirring for at least about two hours, there is formed in high yield a novel product which can be easily recovered by simple filtration or other equivalent means, neutralized to pH 6.5 by slurrying with aqueous sodium bicarbonate, washed with distilled water, and dried in a stream of air at room temperature.

We have further found that the substitution even of ethanol for methanol in our process gives only poorly modified products that do not have the aforesaid greatly improved properties, and have little if any industrial attractiveness. It is believed that the ineffectiveness of alcohols other than methanol arises mainly from the steric effect of their larger molecules which reduces their penetration of and their swelling effect on the dialdehyde starch granule. Thus, methanol is critical to the formation of our novel products. We have also found that the reaction is unsatisfactory if the dialdehyde starch starting material contains a large amount of moisture. We prefer to dry it down to 1 percent or less residual moisture. A temperature-related loss of oxidizing activity, apparently arising from a side reaction of chlorine with methanol, occurs in 40 minutes at 50° C., in 5 hours at 25° C., and in several days at 0° C. This inactivation tendency may be prevented by adding an excess of chlorine to the methanol above that necessary to provide one atom of chlorine per aldehyde group of the original dialdehyde starch and keeping the temperature as low as possible. Replacement of the necessary chlorine may also be made during the reaction.

It is also emphasized that a solution of hydrochloric acid in methanol is not the functional equivalent of chlorine dissolved in methanol in our process and cannot be substituted therefor. As shown by the data of Table I we have found that when a 5 percent oxidized dialdehyde starch is treated with a methanol-HCl solution instead of the methanol-chlorine solution, the paste clarity and the viscosity are unsatisfactory for sizing purposes. The data of Table I also shows that although the respective aldehyde and methoxyl contents of the two products are similar the carboxyl contents are not. Thus the higher paste clarity and the lower viscosity of the chlorine-methanol product must reside in the greatly increased Also, it has been shown that when dialdehyde starch is treated with hypochlorite, there results a substantially useless mixture of randomly and highly depolymerized products that involves a difficult separation resulting in a very low yield of polymeric material. In contrast thereto, our chlorine-methanol reagent permits a controlled, uniform, and limited depolymerization yielding high recoveries of readily dispersible highly polymeric products having greatly improved paste viscosity characteristics and clarities along with retention of low BOD values.

Table II shows the BOD values of our products relative to that of pearl starch as determined after seeding with raw sewage according to the method set forth in the Amer. Public Health Association's "Standard Methods for the Examination of Water, Sewage, and Industrial Wastes," 10th ed., N.Y.C.

TABLE II

| Substrate | Relative BOD,[1] percent |
|---|---|
| Pearl starch, untreated control | 100 |
| Unmodified 5% DAS | 80 |
| Product of 5% DAS | 78 |
| Unmodified 31% DAS | 32 |
| Product of 31% DAS | 28 |
| Unmodified 93% DAS | 4 |
| Product of 93% DAS | 8 |

[1] 5-day values.

From the above values it is apparent that our products retain the BOD requirements of the unmodified dialdehyde starches substantially without change.

Table III shows the dispersing activity on zinc oxide powder of an equal weight (dry basis) of a fully pasted (1 hr. at 90° C. in the presence of sodium hydroxide sufficient to neutralize COOH groups) 1 percent aqueous dispersion of our products. The dispersant effect is measured in terms of Brookfield viscosities at 30 r.p.m. (Brookfield Syndro-Lectric Model LVF viscometer). The data of Table III shows that a threshold of modification (obtained with 10 percent dialdehyde starch) is necessary to impart dispersing activity.

TABLE III

| Medium | Brookfield viscosity, cps. at 30 r.p.m. | |
|---|---|---|
| | Product | Starting material |
| Dist. H₂O | 100,000 | |
| 1% Sodium chloride | 100,000 | |
| Product from 5% DAS | 2,400 | 5,400 |
| Product from 10% DAS | 21 | 4,800 |
| Product from 31% DAS | 25 | 5,400 |
| Product from 93% DAS | 17 | 5,000 |

FIGURE II shows the great increases in clarity of most of the treated members of the dialdehyde starch series. Clarity determinations were made with a Coleman Jr. 6A spectrophotometer, and results are expressed as percent transmission at 650 mμ compared with a distilled water blank.

As shown in Table IV with 5 percent dialdehyde starch, higher reaction temperatures typically cause increased methoxyl contents and lower residual aldehyde contents which result in lowering the gelatinization temperatures and paste viscosities while increasing the paste clarities (until discoloration interferes), but these advantages must be balanced against the decreases in yield which become prohibitive at about 40° C., the decreased yield at any given elevation of reaction temperature being greater the higher the degree of oxidation of the dialdehyde starch starting material.

TABLE IV

| Reaction Temperature, ° C. | Yield, percent of Starting Material | Functional Groups Per 100 Repeating Units | | | Gelatinization [a] | | Paste, pH | Clarity of 5% paste, percent | Brookfield viscosity [d], Cps. |
| --- | --- | --- | --- | --- | --- | --- | --- | --- | --- |
| | | Aldehyde | Carboxyl | Methoxyl | Temp. at start [b], ° C. | Time Range [c] minute | | | |
| 10 | 98 | 7.6 | 1.0 | 2.5 | 71 | 25 | 3.1 | 41 | 3,260 (10%) |
| 30 | 95 | 4.2 | 2.2 | 4.5 | 60 | 23 | 2.7 | 60 | 800 (10%) |
| 40 | 64 | 3.6 | 2.1 | 8.8 | 45 | 9 | 3.4 | [e] 50 | 36 (20%) |

[a] Samples were pasted with sufficient sodium hydroxide to neutralize one-fourth of the carboxyl groups.
[b] Start of gelatinization is defined as the point at which the amylograph curve exhibits the maximum increase in rate of viscosity rise; i.e., the point at which the second derivative of viscosity with respect to time is at a maximum.
[c] Gelatinization range is the time from the start of gelatinization until maximum viscosity is reached.
[d] Viscosities were measured at 25° C. 1 hour after pastes were removed from amylograph. Values in parentheses indicate solids content of pastes.
[e] Paste was discolored.

Figure 3:
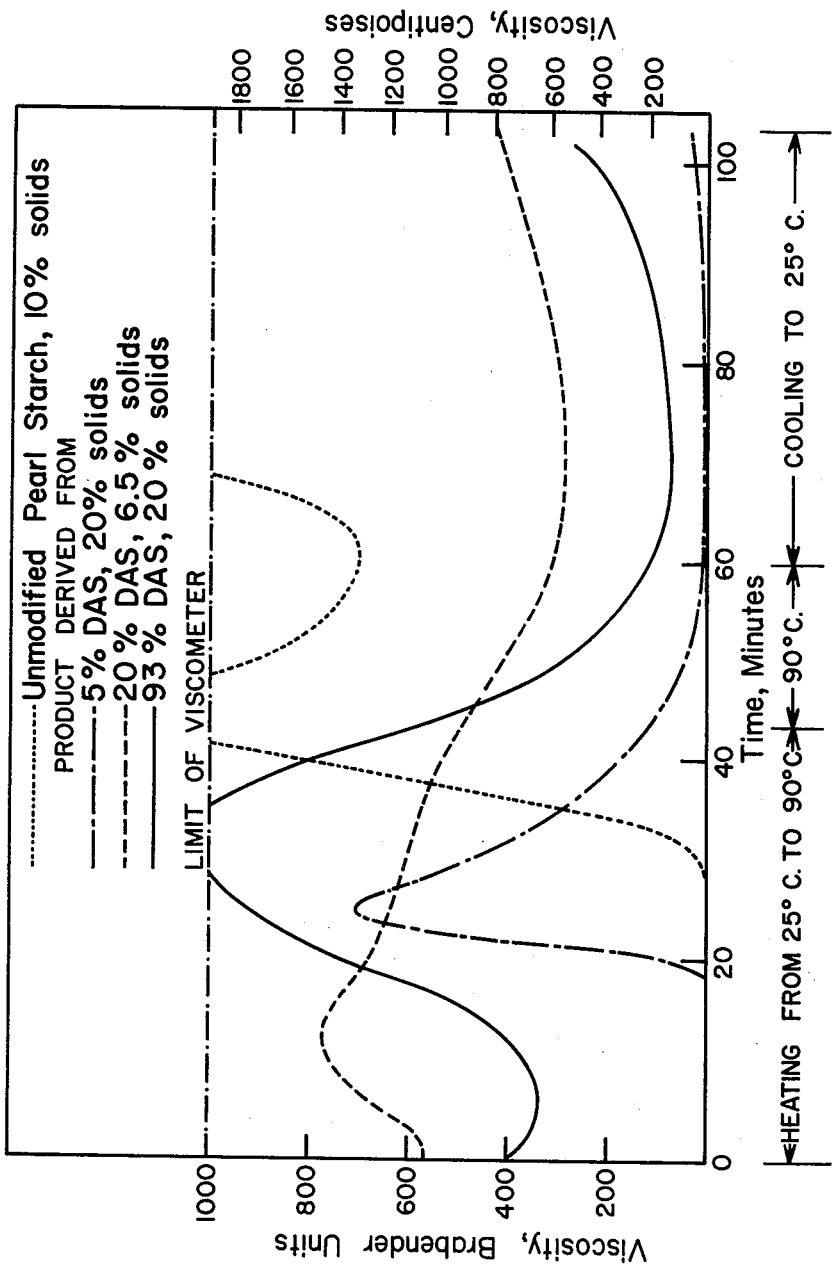

Table V and FIGURE 3 show the absence of setback in pastes of our chemically modified dialdehyde starches as against its development in a paste of unmodified pearl starch.

TABLE V

| | Brookfield viscosities (cps.) on pastes (18% solids) at 25° C. and at 55° C. compared with that of unmodified pearl starch (pearl, 10% solids) | | | | |
| --- | --- | --- | --- | --- | --- |
| | 25° C. | | | 55° C. | |
| | Initial | 1-day | 1-week | Initial | 2-hours |
| Pearl starch (control) | >100,000 | >100,000 | >100,000 | 16,200 | 97,000 |
| Product from 5% DAS | 13 | 14 | 15 | 6 | 6 |
| Product from 10% DAS | 193 | 220 | 196 | 98 | 114 |
| Product from 31% DAS | 359 | 339 | 178 | 260 | 236 |
| Product from 93% DAS | 300 | 900 | >100,000 | 30 | 200 |

The following examples are presented to illustrate the practice of our invention.

*Example 1*

One part of chlorine was dissolved in 20 parts of methanol containing 4 parts of 5 percent dialdehyde starch (10 aldehyde groups per 100 AGU's) at 10° C. and the mixture was warmed to 25° C. and stirred for 2 hours. The product was isolated by filtration, neutralized with sodium bicarbonate to pH 6.5 in aqueous slurry, washed three times with water by slurrying on a filter, and dried in a stream of air at room temperature. Yield was 96 percent of the weight of starting material.

The D. S. of functional groups in this product was as follows: aldehyde, 0.05; carboxyl, 0.02; and methyl, 0.09. When pasted in hot water in the presence of sufficient alkali to neutralize its titratable carboxyl groups and cooled to room temperature, this product had a low and stable viscosity (at 10% solid: initial, 55; 1 hr., 58; 24 hrs., 58; 1 week, 42), and was found to be useful as an adhesive for paper coatings. With coating colors containing 50 percent solids, 20 percent of which was the product of this example, wax pick values of 7–8 were obtained, and values obtained with the I.G.T. printability tester were higher than those of commercially available coating adhesives. This product had a BOD value of 78 percent as compared with that of untreated pearl cornstarch.

*Example 2*

Similar to Example 1 except that 1 part of 31 percent dialdehyde starch (62 aldehyde groups per 100 AGU's) was reacted at 37° C. The resulting product was obtained in a 76 percent yield and had a D.S. of 0.21 for aldehyde, 0.16 for carboxyl, and 0.46 for methyl. A 5-percent aqueous paste of this product had a clarity value of 84 percent compared with only 8 percent for a similar paste of untreated commercial pearl starch. This high clarity indicates good dispersibility and is usually accompanied by high bonding strength. The BOD of this product was only 28 percent of that of untreated pearl cornstarch. This combination of high clarity and low BOD points to possible application as a textile size.

*Example 3*

Similar to Example 1 except that one part of 93 percent dialdehyde starch (186 aldehyde groups per 100 AGU's) was used and the reaction temperature was lowered to 15° C. Product yield was 100 percent, and D.S. was 0.34 for aldehyde, 0.37 for carboxyl, and 1.53 for methyl. When isolated in the free acid form, this product, because of its high substitution with methyl groups, could be swollen with organic solvents such as acetone and chloroform and was resistant to the action of water. However, in the presence of dilute aqueous alkali sufficient to neutralize part of the carboxyl groups to the sodium salt, this product was swollen in cold water. After gelatinization in hot water in the presence of alkali equivalent to one-fourth of its titratable acidity, a 20-percent dispersion had a Brookfield viscosity of 6,000 cps. Viscosity was measured at 30 r.p.m., 24 hours after the dispersion had been prepared. This product had only 8 percent as high a BOD value as untreated pearl cornstarch.

Having fully disclosed our invention, we claim:

1. The process of modifying a periodate-oxidized dialdehyde starch comprising the steps of suspending 1–4 parts of periodate-oxidized dialdehyde starch in about 20 parts of methanol at about 10°–25° C., adding chlorine to provide a concentration of 5 parts by weight per 100 ml., stirring the mixture at about 10°–25° C. for at least about two hours, separating the reacted dialdehyde starch product, adjusting the pH of the separated product to about 6.5, and drying the final product in a stream of air.

2. The products prepared by the process of claim 1, said products being characterized by having a carboxyl D.S. of 0.005 to 0.37, a methoxy D.S. of 0.05 to 1.53 and a residual aldehyde D.S. of 0.01 to 0.34.

References Cited in the file of this patent

Goldstein et al.: "Chemistry and Industry," Jan. 11, 1958, pages 40–42.